(12) United States Patent
Pontones

(10) Patent No.: US 6,651,575 B1
(45) Date of Patent: Nov. 25, 2003

(54) SHORE-USE BILGE BLOWER

(76) Inventor: Michael Elias Pontones, 45 Glengary Dr., Delaware, OH (US) 43015

(*) Notice: Subject to any disclaimer, the term of this patent is extended or adjusted under 35 U.S.C. 154(b) by 0 days.

(21) Appl. No.: 10/260,105

(22) Filed: Sep. 27, 2002

(51) Int. Cl.[7] .................................................. B63J 2/00
(52) U.S. Cl. .................. 114/211; 114/183 R; 415/182.1
(58) Field of Search ................................. 114/211, 173, 114/177, 183 R; 415/182.1, 213.1, 220, 232

(56) References Cited

U.S. PATENT DOCUMENTS

| | | | | |
|---|---|---|---|---|
| 3,870,008 A | * | 3/1975 | Wilkerson | 114/211 |
| 4,019,454 A | * | 4/1977 | Landwerlen | 114/197 |
| 4,235,181 A | * | 11/1980 | Stickney | 114/211 |
| 4,991,532 A | * | 2/1991 | Locke | 114/211 |
| 5,003,906 A | * | 4/1991 | Sova | 114/211 |
| 5,233,226 A | * | 8/1993 | Hanover et al. | 114/211 |
| 5,787,833 A | | 8/1998 | Lewis | |
| 6,038,992 A | * | 3/2000 | Smith | 114/183 R |
| 6,050,867 A | * | 4/2000 | Shields et al. | 440/88 C |
| 6,471,473 B1 | * | 10/2002 | Wilkinson et al. | 415/182.1 |

OTHER PUBLICATIONS

West Marine 1998 Master Catalog p. 286.

* cited by examiner

*Primary Examiner*—S. Joseph Morano
*Assistant Examiner*—Lars A. Olson
(74) *Attorney, Agent, or Firm*—Dane Butzer

(57) ABSTRACT

A bilge blower for a watercraft such as a power boat. The bilge blower includes a blower unit and a power unit. The blower unit can be removeably attached to a bilge drain on the watercraft. The power unit supplies power to the blower unit. When the blower unit is attached and power is supplied, the bilge blower draws air and vapor from the watercraft's bilge through the bilge drain. The blower unit preferably includes a fan with a brushless motor. A brushless motor is used to reduce the likelihood of sparks which could ignite any fuel vapor. In the preferred embodiment, the blower unit includes a housing that attaches to the bilge drain with a threaded connector.

21 Claims, 6 Drawing Sheets

SHORE-USE BILGE BLOWER

BACKGROUND OF THE INVENTION

1. Field of the Invention

This invention relates to a bilge blower for use with watercraft. In particular, the invention relates to a bilge blower that attaches to a watercraft's bilge drain when the watercraft is onshore.

2. Description of the Related Art

One hazard for people who operate motorized watercraft is that bilges in watercraft can fill with fuel vapor. This can happen when a watercraft is onshore, as well as when the craft is in operation. This vapor tends to be highly flammable and even explosive. A small spark, for example a spark thrown off by the craft's engine, can ignite the fuel vapor, resulting in a fire or explosion.

For these reasons, the United States Coast Guard requires that certain motorized vessels with permanently installed gasoline engines and fuel tanks be equipped with internal bilge blowers. A blower of this type is a permanent part of the vessel in which it is installed and is typically powered by the vessel's electrical system. In order to alleviate the potential for a fuel vapor fire or explosion, a vessel's bilge blower must be run for at least four minutes prior to starting the vessel's engine. In addition, the blower should be run at all times when the vessel's engine is idling. Use of such bilge blowers has reduced the number of fuel vapor fires and explosions.

Despite the success of the use of bilge blowers, fuel vapor problems still exist. When a motorized watercraft is stored onshore, fuel vapor can accumulate in the bilge. If the watercraft is covered and parked in the sun, the temperature in the watercraft can rise dramatically. This increased temperature can contribute to even more buildup of fuel vapor in the bilge. While the watercraft is in storage, the required internal bilge blower typically is not being run, so the vapor can continue to accumulate as long as the craft is being stored.

As a result, after a watercraft has been stored for any significant period of time, an accidental spark or flame could result in a fuel vapor fire or explosion. For example, a person with a cigarette could set off a fire or explosion. Likewise, static electricity could ignite the fuel vapor. Even a defective bilge blower could throw off a spark, triggering a disaster. This danger exists until the watercraft has been taken out of storage and the craft's internal bilge blower has been run.

Fuel vapor is not the only troublesome substance that can accumulate in a watercraft's bilge during storage. Another hazard is the accumulation of water vapor. If the vessel is stored for any extended period of time, this water vapor can provide an ideal environment for molds, fungus, mildew, and other infestations. Again, a watercraft's internal bilge blower provides little relief from this hazard because the blower typically is not run while the craft is in onshore storage.

SUMMARY OF THE INVENTION

A solution is needed for the problem of buildup of fuel and water vapor in a watercraft's bilge during storage. Because the solution should function while the vessel is in storage and therefore largely unattended, the solution should be capable of operating for an extended period of time without maintenance or other operator intervention.

The invention addresses these problems with a bilge blower that attaches to a watercraft's bilge drain. All watercraft that have a bilge include a bilge drain for draining water from the bilge. When the watercraft is onshore, this bilge drain provides a good access point for drawing fuel and water vapor from the bilge.

Accordingly, one aspect of the invention is a bilge blower for a watercraft such as a power boat. The bilge blower includes a blower unit and a power unit. The blower unit can be removeably attached to a bilge drain on the watercraft. The power unit supplies power to the blower unit. When the blower unit is attached and power is supplied, the bilge blower draws air and vapor from the watercraft's bilge through the bilge drain.

The blower unit preferably includes a fan with a brushless motor. A brushless motor is used to reduce the likelihood of sparks which could ignite any fuel vapor.

In the preferred embodiment, the blower unit includes a housing that attaches to the bilge drain with a threaded connector. Most bilge drains have one-half inch National Pipe Taper (NPT) female openings shaped to receive one-half inch National Pipe Taper male drain plugs, which are typically shaped like one-half inch NPT threaded pipes. Thus, the threaded connector provides an easy and convenient method for attaching the bilge blower to the bilge drain.

Preferably, the housing is made of brass, aluminum, or stainless steel. The housing also can be made of plastic.

In order to provide power over an extended period without operator intervention, the power unit preferably generates power using solar cells. With this embodiment, though, the blower unit will not run if insufficient light is present. Alternatively, one or more batteries could be used. However, batteries might have to be replaced. Thus, in a preferred embodiment, both solar cells and one or more rechargeable batteries are used in conjunction with each other. When sufficient light is present, the solar cells supply power both to run the blower unit and to recharge the batteries. When less light is present, the batteries can run the blower unit.

Preferably, the solar cells are removably mountable on an anti-cavitation plate of a motor for the watercraft. The anti-cavitation plate provides a convenient and easily-accessible location for mounting the solar cells. Alternatively, the solar cells can be mountable on a tongue of a trailer for the watercraft. The tongue mounted embodiment is particularly useful for watercraft that lack outboard motors (and thus anti-cavitation plates).

Because solar cells and other sources of long-term power can be relatively expensive, a locking mechanism can be provided for locking the power unit in place on the watercraft or on a trailer for the watercraft.

The invention also includes a method of using the bilge blower to draw air and vapor from a watercraft's bilge through the craft's bilge drain, thereby reducing fuel and water vapor in the bilge.

This brief summary has been provided so that the nature of the invention may be understood quickly. A more complete understanding of the invention may be obtained by reference to the following description of the preferred embodiments thereof in connection with the attached drawings.

DESCRIPTION OF THE PREFERRED EMBODIMENT

Figure 1:
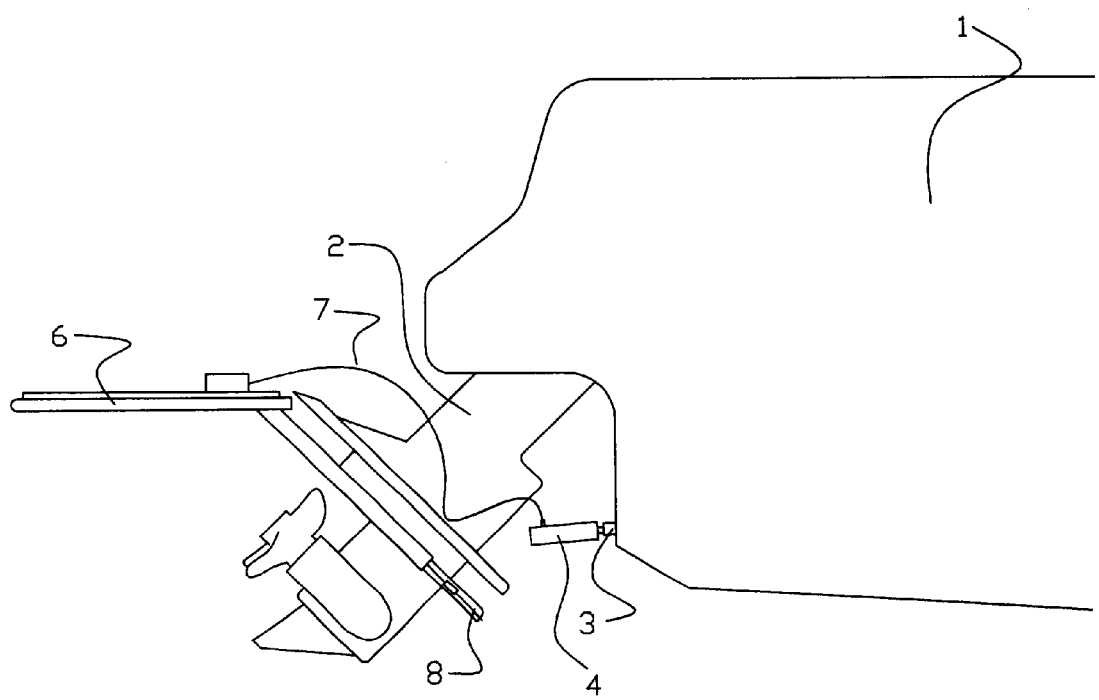
FIG. 1 shows a shore-use bilge blower according to one embodiment of the invention.

FIG. 1 shows a shore-use bilge blower according to one embodiment of the invention.

Briefly, a bilge blower for a watercraft according to the invention includes a blower unit that is removeably attachable to a bilge drain on the watercraft and a power unit that supplies power to the blower unit. The bilge blower draws air and vapor from the watercraft's bilge through the bilge drain.

In more detail, FIG. 1 shows a back portion of watercraft 1, in this instance a sterndrive (inboard/outboard) power boat. The invention is equally applicable to any type of watercraft that includes a bilge and bilge drain. For example, the invention can be used with inboard configuration vessels, sailboats that include engines for motoring, personal watercraft such as Kawasaki Jet Skis and Yamaha Waverunners, and the like.

In FIG. 1, watercraft 1 includes outboard motor 2 and bilge drain 3. Blower unit 4 of a bilge blower according to the invention is removably attached to bilge drain 3.

Most bilge drains have one-half inch National Pipe Taper (NPT) female openings shaped to receive one-half inch National Pipe Taper male drain plugs, which are typically shaped like one-half inch NPT threaded pipes. Thus, blower unit 4 preferably includes a section shaped like one-half inch NPT threaded pipe so that the blower unit can simply screw into the bilge drain. This arrangement promotes relatively easy installation and removal of blower unit 4 from bilge drain 3. Other arrangements are possible, for example to accommodate different sizes and types of bilge drains.

Blower unit 4 preferably includes a fan for drawing air and vapor from the bilge of watercraft 1 through bilge drain 3. In the preferred embodiment, the fan uses a brushless motor in order to avoid sparks that could ignite any fuel vapor in the bilge.

In FIG. 1, power for the blower unit's fan is supplied by power unit 6 through transmission line 7. In a preferred embodiment, power unit 6 uses solar cells to supply power. Thus, the bilge blower can run indefinitely as long as sufficient light is present.

Power unit 6 preferably includes a bracket that slides over anti-cavitation plate 8 of outboard motor 2 when watercraft 1 is onshore. The anti-cavitation plate provides a convenient place to attach power unit 6. In addition, a user would be extremely unlikely to try to put watercraft 1 in the water while power unit 6 was on anti-cavitation plate 8. Therefore, the user would be extremely unlikely to accidentally use watercraft 1 while the bilge blower was still installed, which could introduce water into the bilge.

FIGS. 2, 3a, 3b and 3c shows details of embodiments of a blower unit for a shore-use bilge blower according to the invention.

Figure 2:
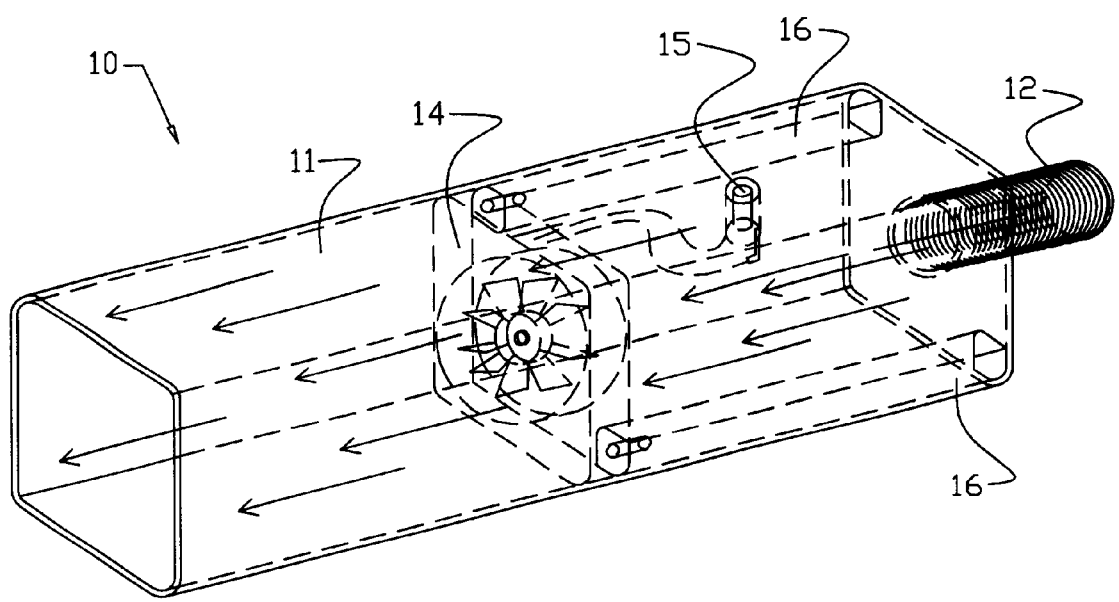
FIG. 2, 3a, 3b and 3c shows details of embodiments of a blower unit for a shore-use bilge blower according to the invention.

FIG. 2 is a perspective view of a blower unit such as blower unit 4. Blower unit 10 includes housing 11 with threaded connector 12. The housing can be made of any suitably strong, durable, and preferably rust-resistant material. Examples of suitable materials include, but are not limited to, brass, aluminum, stainless steel, or plastic. Plastic is the least preferred of these because air blowing over the plastic might result in a buildup of a static charge.

Threaded connector 12 preferably matches the dimensions and threading of one-half inch NPT pipe. However, as discussed above, other dimensions and threading can be used in order to match various different bilge drains.

Blower unit 10 in FIG. 2 also includes fan 14. Again, this fan preferably uses a brushless motor in order to avoid sparks that could ignite any fuel vapor in the bilge. In the preferred embodiment, a fan with a 12 volt motor is used, and the fan has a capacity of at least 7.7 to 9.0 cubic feet per minute (CFM). Of course, fans with different specifications can be used without departing from the invention.

Fan 14 preferably receives power from power jack 15. A transmission line such as transmission line 7 in FIG. 1 attaches to this jack, preferably using a matching plug, in order to provide power to fan 14.

Fan 14 can be mounted on posts 16 in housing 11. Preferably, at least two posts are used as shown in FIG. 2. More posts can be used to increase stability. In any case, the posts can include threaded counterbores in order to receive mounting screws. Other mounting arrangements are possible. One alternative arrangement is illustrated in FIGS. 3a to 3c.

Figure 3A:
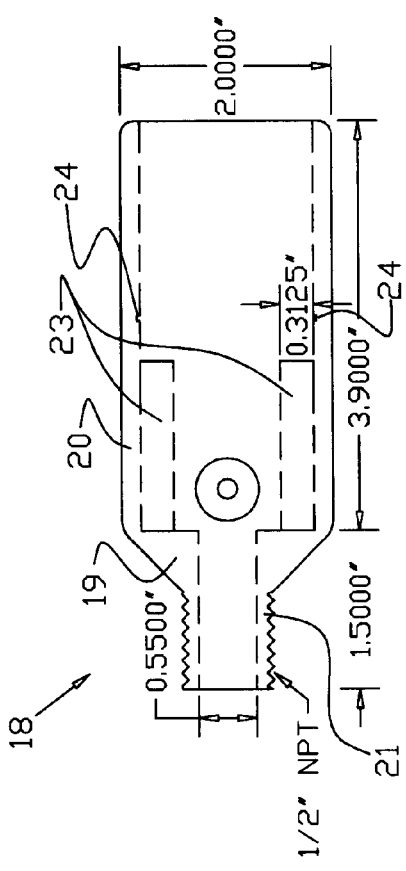
Figure 3C:
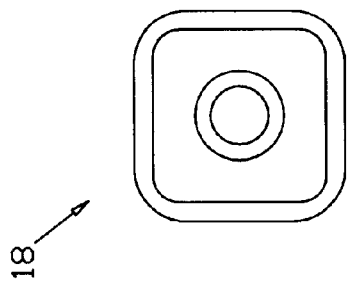
Figure 3B:
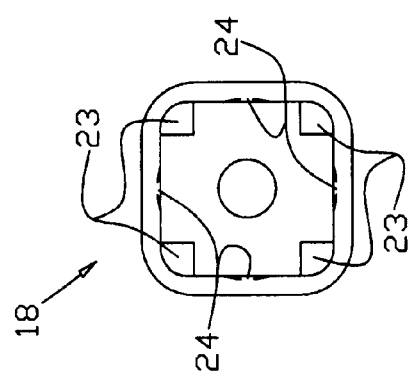

FIGS. 3a to 3c are plan views of a blower unit such as blower unit 4. FIG. 3a is a side view, FIG. 3b is an open-end-on view, and FIG. 3c is a connector-end-on view. These figures include dimensions for a preferred embodiment of the invention. Of course, the invention is not limited to these particular dimensions in any way.

Blower unit 18 in FIG. 3 is very similar to blower unit 10 in FIG. 2, except for some obvious differences in shape and a different mounting arrangement. The primary difference in shape is angled portion 19 between housing 20 and threaded connector 21. This angled portion adds strength to the blower unit.

The mounting arrangement in FIGS. 3a to 3c includes posts 23 and notch 24 for a snap ring (not shown). In this mounting arrangement, a fan (not shown) can be held securely between the ends of posts 23 and a snap ring inserted in notch 24.

Figure 4:
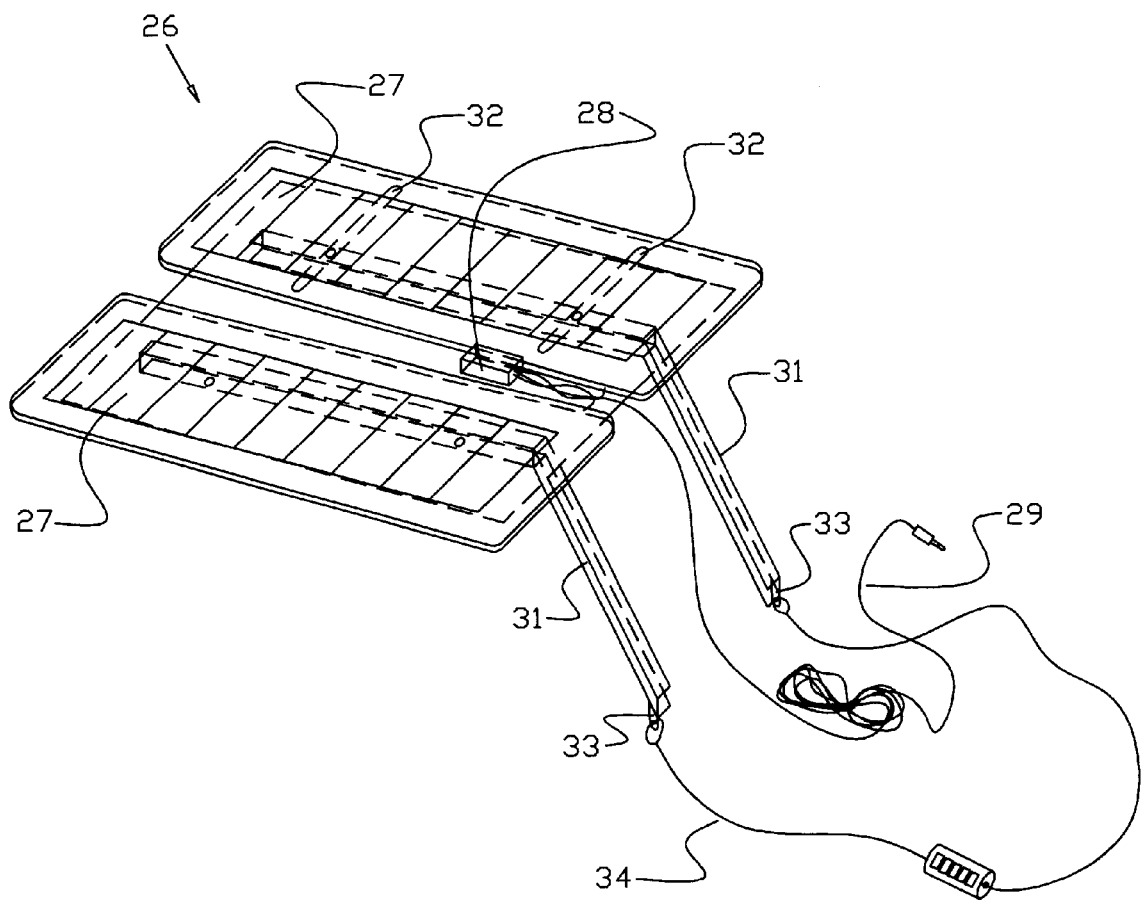
FIGS. 4, 5a and 5b shows details of embodiments of a power unit for a shore-use bilge blower according to the invention.
Figure 5A:
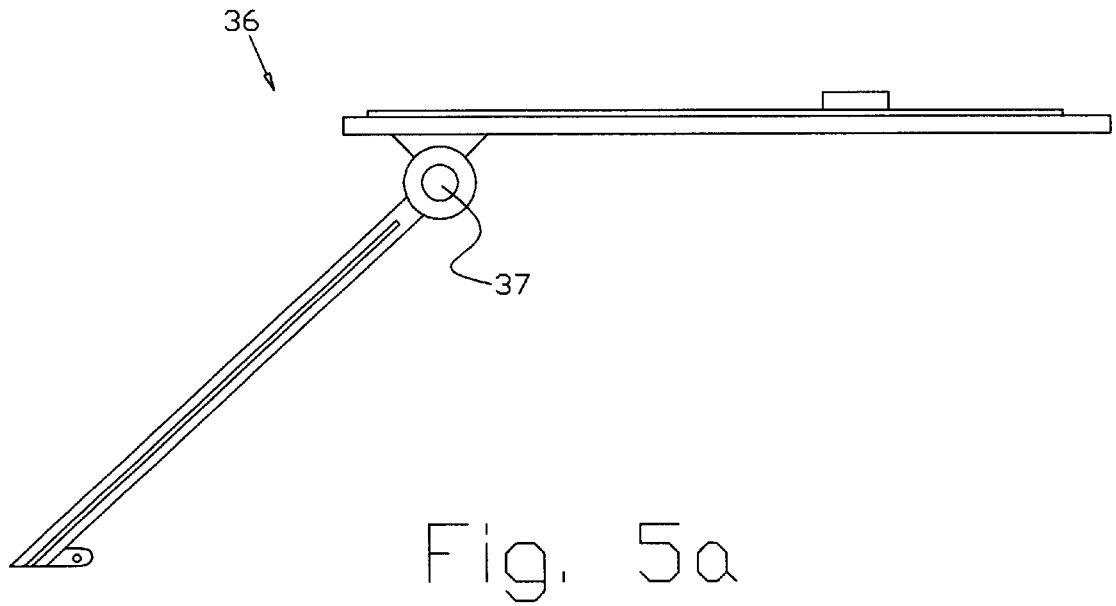
Figure 5B:
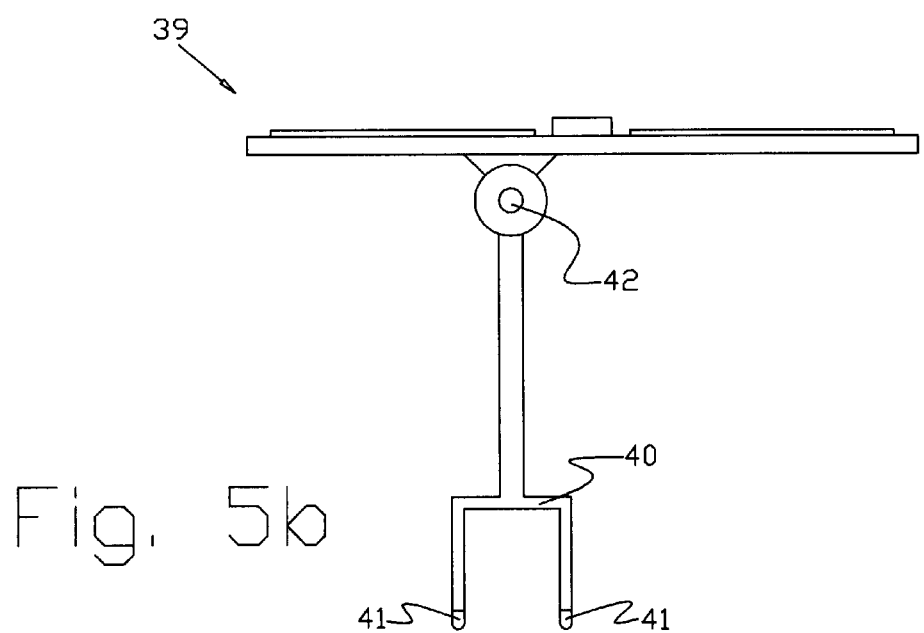

FIGS. 4, 5a and 5b shows details of embodiments of a power unit for a shore-use bilge blower according to the invention.

FIG. 4 is a perspective view of a power unit such as power unit 6. In FIG. 4, power unit 26 includes solar cells 27 and power regulator 28. As mentioned above, the invention preferably uses solar cells to provide power to the blower unit so that the bilge blower can run indefinitely with little or no operator intervention as long as sufficient light is present.

Alternatively, a combination of sources can be used to provide power to the blower unit. For example, the power unit can use both solar cells and one or more rechargeable batteries to provide power to the blower unit. One convenient location for mounting the batteries is in or near power regulator 28.

In the embodiment with solar cells and one or more batteries, the solar cells can provide power to the blower unit while also recharging the batteries as long as sufficient light is present. However, if insufficient light is present for the solar cells to power the blower unit, the batteries can take over. If suitably powerful batteries and solar cells are used, this arrangement can power the blower unit continuously around the clock and even through inclement weather.

Power regulator 28 is preferably included to ensure that proper voltage is supplied to the blower unit. If insufficient light is present to generate enough power, power regulator 28 preferably blocks transmission of this power. This prevents the power unit from driving the blower unit at too low of a voltage, which could be damaging to the blower unit. Conversely, power regulator 28 preferably limits the voltage so that too much power is not supplied, which also could damage the blower unit. In the preferred embodiment, power regulator 28 also includes a fuse, for example a two amp fuse, to prevent damage in case of a short or the like.

In the solar cell and rechargeable battery embodiment of the invention, the power regulator could also control switching power to and from the solar cells and rechargeable batteries.

The power from power unit 26 preferably is supplied to the blower unit through transmission line 29. The transmission line preferably includes a plug that matches a jack on the blower unit.

In one embodiment, power unit 26 is removably mountable on an anti-cavitation plate of a motor for a watercraft. The term "removably mountable" is used to indicate that the power unit can be installed and removed from the watercraft as needed, preferably without excessive effort.

FIG. 4 shows bracket 31 that can slide over an anti-cavitation plate in order to mount power unit 26 on the anti-cavitation plate. Adjustment slots 32 permit the bracket to adjust to different widths of anti-cavitation plates.

Because solar cells 27 of power unit 26 may be somewhat expensive, the power unit preferably should be able to be locked onto an anti-cavitation plate. To this end, bracket 31 preferably include tabs 33 for locking cable 34 or some other locking device.

Locking cable 34 can take many forms. In FIG. 4, locking cable 34 is shown in a form akin to a locking cable for skis. The cable includes a roller-style integrated lock. A close examination of FIG. 1 reveals one way in which this arrangement can be used to lock onto an anti-cavitation plate. Other types of locks, cables, and locking arrangements can be used.

FIGS. 5a and 5b show some possible variations on a power unit according to the invention. In FIG. 5a, the mounting arrangement of power unit 36 includes adjustable pivot 37, for example in the form of a notched joint secured by a wing nut. This adjustable pivot permits alignment of power unit 36 to accommodate differently angled anti-cavitation plates, different alignments of illumination, and the like.

FIG. 5b shows an embodiment of the invention that can be removably mounted on a tongue of a trailer for a watercraft. This embodiment is particularly useful with watercraft that have inboard engines and therefore no exposed anti-cavitation plate. Of course, this embodiment can also be used with any other type of watercraft.

In FIG. 5b, power unit 39 includes bracket 40 that can fit over a tongue of a trailer (not shown). The bracket preferably includes tabs 41 for attachment of a locking cable or other locking device. The arrangement in FIG. 5b also includes adjustable pivot 42, for example in the form of a notched joint secured by a wing nut, for aligning power unit 39 to accommodate different angles of illumination.

Alternative Embodiments

Figure 6:
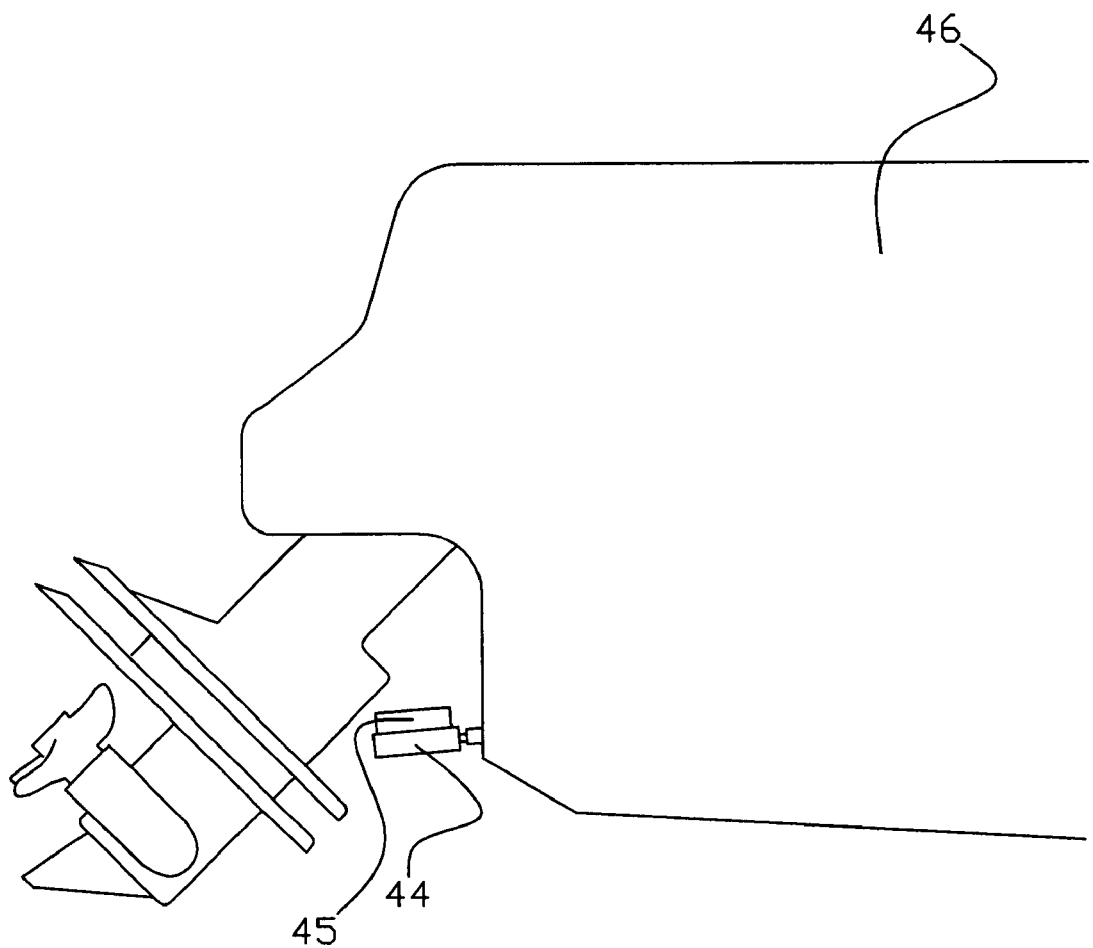
FIG. 6 shows an alternative embodiment of a shore-use bilge blower according to the invention.

FIG. 6 shows an alternative embodiment of a shore-use bilge blower according to the invention. In this embodiment, power is supplied to blower unit 44 by integrated battery or batteries 45, from watercraft 46, or from some other source. Thus, the power unit is in this embodiment is the battery or batteries, the watercraft's power system, or the other source.

Additional alternative embodiments exist. Thus, although preferred embodiments of the invention are disclosed herein, many variations are possible which remain within the content, scope and spirit of the invention, and these variations would become clear to those skilled in the art after perusal of this application.

What is claimed is:

1. A bilge blower for a watercraft, comprising:
   a blower unit that is removeably attachable to a bilge drain on the watercraft; and
   a power unit that supplies power to the blower unit;
   whereby the bilge blower draws air and vapor from the watercraft's bilge through the bilge drain.

2. A bilge blower as in claim 1, wherein the blower unit includes a fan with a brushless motor.

3. A bilge blower as in claim 1, wherein the blower unit includes a housing that attaches to the bilge drain with a threaded connector.

4. A bilge blower as in claim 3, wherein the housing is made of brass, aluminum, stainless steel, or plastic.

5. A bilge blower as in claim 1, wherein the power unit uses solar cells to provide power to the blower unit.

6. A bilge blower as in claim 5, wherein the solar cells are removably mountable on an anti-cavitation plate of a motor for the watercraft.

7. A bilge blower as in claim 5, wherein the solar cells are removably mountable on a tongue of a trailer for the watercraft.

8. A bilge blower as in claim 1, further including a locking mechanism that can lock the power unit in place on the watercraft or on a trailer for the watercraft.

9. A bilge blower as in claim 1, wherein the power unit uses at least one dedicated battery to provide power to the blower unit.

10. A bilge blower as in claim 1, wherein the power unit uses both solar cells and at least one rechargeable battery to provide power to the blower unit, with the rechargeable battery recharged by the solar cells when sufficient light is present.

11. A method of reducing fuel and water vapor in a bilge of a watercraft, comprising the steps of:
    removeably attaching a blower unit of a bilge blower to a bilge drain on the watercraft; and
    supplying power to the blower unit;
    whereby the bilge blower draws air and vapor from the watercraft's bilge through the bilge drain.

12. A method as in claim 11, wherein the blower unit includes a fan with a brushless motor.

13. A method as in claim 11, wherein the blower unit includes a housing that attaches to the bilge drain with a threaded connector.

14. A method as in claim 13, wherein the housing is made of brass, aluminum, stainless steel, or plastic.

15. A method as in claim 11, wherein the power is supplied from solar cells.

16. A method as in claim 15, wherein the solar cells are removably mountable on an anti-cavitation plate of a motor for the watercraft.

17. A method as in claim 15, wherein the solar cells are removably mountable on a tongue of a trailer for the watercraft.

18. A bilge blower as in claim 11, wherein the power is supplied from a power unit that can be locked in place on the watercraft or on a trailer for the watercraft.

19. A method as in claim 11, wherein the power is supplied from at least one dedicated battery.

20. A method as in claim 11, wherein the power is supplied from both solar cells and at least one rechargeable battery, with the rechargeable battery recharged by the solar cells when sufficient light is present.

21. A bilge blower for a watercraft, comprising:
    blower means for drawing air and vapor from the watercraft's bilge through a bilge drain on the watercraft; and
    power supply means for supplying power to the blower means.

* * * * *